United States Patent
Dormody et al.

(10) Patent No.: US 12,298,196 B2
(45) Date of Patent: *May 13, 2025

(54) SYSTEMS AND METHODS FOR DETERMINING WHEN TO CALIBRATE A PRESSURE SENSOR OF A MOBILE DEVICE

(71) Applicant: NextNav, LLC, Sunnyvale, CA (US)

(72) Inventors: Michael Dormody, San Jose, CA (US); Guiyuan Han, San Jose, CA (US); Badrinath Nagarajan, Cupertino, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,536

(22) Filed: Jun. 27, 2023

(65) Prior Publication Data

US 2023/0341286 A1  Oct. 26, 2023

Related U.S. Application Data

(63) Continuation of application No. 17/443,135, filed on Jul. 21, 2021, now Pat. No. 11,733,119, which is a
(Continued)

(51) Int. Cl.
G01L 27/00 (2006.01)
G01C 21/20 (2006.01)
G01L 19/00 (2006.01)

(52) U.S. Cl.
CPC ............ *G01L 27/005* (2013.01); *G01L 19/00* (2013.01); *G01C 21/206* (2013.01)

(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS 8,130,141 B2  3/2012  Pattabiraman et al.
9,057,606 B2  6/2015  Wolf et al.
(Continued)

FOREIGN PATENT DOCUMENTS

CN  107923743 A  4/2018
CN  106597502 B  10/2019

OTHER PUBLICATIONS

Germann et al., "Scale-Dependence of the Predictability of Precipitation from Continental Radar Images. Part I: Description of the Methodology", American Meteorological Society, Monthly Weather Review, vol. 130, Dec. 2002, pp. 2859-2873.
(Continued)

*Primary Examiner* — Andre J Allen
(74) *Attorney, Agent, or Firm* — MLO, a professional corp.

(57) ABSTRACT

A method involves determining weighted metric values for each metric of a plurality of metrics by applying a weight for each metric to a determined value of each metric. The method further involves using the weighted metric values to determine if a pressure sensor of a mobile device should be calibrated using information associated with the first location, and if a determination is made that the pressure sensor of the mobile device should be calibrated using information associated with the first location, then using the information associated with the first location to calibrate the pressure sensor of the mobile device.

20 Claims, 4 Drawing Sheets

Related U.S. Application Data continuation of application No. 16/364,695, filed on Mar. 26, 2019, now Pat. No. 11,073,441.

(60) Provisional application No. 62/687,738, filed on Jun. 20, 2018, provisional application No. 62/676,275, filed on May 24, 2018.

(58) Field of Classification Search
CPC ... G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16

USPC .................................................. 73/700–756
See application file for complete search history.

(56) References Cited

U.S. PATENT DOCUMENTS

| | | | |
|---|---|---|---|
| 9,980,246 | B2 | 5/2018 | Pattabiraman et al. |
| 10,514,258 | B2 | 12/2019 | Dormody et al. |
| 11,555,699 | B2 | 1/2023 | Dormody et al. |
| 2016/0047649 | A1 | 2/2016 | Edge et al. |
| 2016/0091385 | A1 | 3/2016 | Heshmati et al. |
| 2016/0245716 | A1 | 8/2016 | Gum et al. |
| 2016/0273903 | A1 | 9/2016 | Cattoen et al. |
| 2017/0234756 | A1 | 8/2017 | Youssef et al. |
| 2017/0280301 | A1 | 9/2017 | Chang et al. |
| 2018/0206078 | A1 | 7/2018 | Venkatraman et al. |
| 2019/0360804 | A1 | 11/2019 | Dormody et al. |
| 2020/0088517 | A1 | 3/2020 | Dormody et al. |
| 2020/0116483 | A1 | 4/2020 | Dormody et al. |

OTHER PUBLICATIONS

Ghaderi et al., "Deep Forecast: Deep Learning-based Spatio-Temporal Forecasting", ICML 2017 Time Series Workshop, Sydney, Australia, 2017, 6 pages.
Henn et al., "A Comparison of Methods for Filling Gaps in Hourly Near-Surface Air Temperature Data", Journal of Hydometeorology, American Meteorological Society, vol. 14, Jun. 2013, pp. 929-945.
Moffat et al., "Comprehensive comparison of gap-filling techniques for eddy covariance net carbon fluxes", Agricultural and Forest Meteorology, vol. 147, Issues 3-4, Dec. 10, 2007, pp. 209-232.
Notice of Allowance and Fees dated Apr. 5, 2023 for U.S. Appl. No. 17/443,135.
Notice of Allowance dated Apr. 6, 2021 for U.S. Appl. No. 16/364,695.
Office Action dated Aug. 4, 2021 for U.S. Appl. No. 16/364,657.
Office Action dated Jan. 19, 2023 for China Patent Application No. 201980033527.5.
Office Action dated May 18, 2022 for China Patent Application No. 201980033527.5.
Office Action dated May 24, 2022 for U.S. Appl. No. 16/364,657.
Office Action dated Nov. 14, 2022 for U.S. Appl. No. 17/443,135.
Sankaran et al., "Using Mobile Phone Barometer for Low-Power Transportation Context Detection", SenSys '14 Proceedings of the 12th ACM Conference on Embedded Network Sensor Systems, Nov. 3-6, 2014, pp. 191-205.
Office Action dated May 20, 2024 for U.S. Appl. No. 18/068,295.
Office Action dated Aug. 30, 2024 for U.S. Appl. No. 18/068,295.

SYSTEMS AND METHODS FOR DETERMINING WHEN TO CALIBRATE A PRESSURE SENSOR OF A MOBILE DEVICE

RELATED APPLICATIONS

This application is a continuation of U.S. patent application Ser. No. 17/443,135, filed 21 Jul. 2021, entitled SYSTEMS AND METHODS FOR DETERMINING WHEN TO CALIBRATE A PRESSURE SENSOR OF A MOBILE DEVICE, which claims priority to U.S. Pat. No. 11,073,441, filed 26 Mar. 2019, entitled SYSTEMS AND METHODS FOR DETERMINING WHEN TO CALIBRATE A PRESSURE SENSOR OF A MOBILE DEVICE; U.S. Pat. Appl. No. 62/676,275, filed 24 May 2018, entitled SYSTEMS AND METHODS FOR DETERMINING WHEN TO CALIBRATE A PRESSURE SENSOR OF A MOBILE DEVICE; and U.S. Pat. Appl. No. 62/687,738, filed 20 Jun. 2018 entitled SYSTEMS AND METHODS FOR DETERMINING WHEN TO CALIBRATE A PRESSURE SENSOR OF A MOBILE DEVICE; which are hereby incorporated by reference in their entirety for all purposes.

TECHNICAL FIELD

Aspects of this disclosure generally pertain to positioning of mobile devices.

BACKGROUND

Determining the exact location of a mobile device (e.g., a smart phone operated by a user) in an environment can be quite challenging, especially when the mobile device is located in an urban environment or is located within a building. Imprecise estimates of the mobile device's altitude, for example, may have life or death consequences for the user of the mobile device since the imprecise altitude estimate can delay emergency personnel response times as they search for the user on multiple floors of a building. In less dire situations, imprecise altitude estimates can lead a user to the wrong area in an environment.

Different approaches exist for estimating an altitude of a mobile device. In a barometric-based positioning system, altitude can be computed using a measurement of pressure from a calibrated pressure sensor of a mobile device along with ambient pressure measurement(s) from a network of calibrated reference pressure sensors and a measurement of ambient temperature from the network or other source. An estimate of an altitude of a mobile device ($h_{mobile}$) can be computed by the mobile device, a server, or another machine that receives needed information as follows:

$$h_{mobile} = h_{sensor} - \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device by a pressure sensor of the mobile device, $P_{sensor}$ is an estimate of pressure at the location of a reference pressure sensor that is accurate to within a tolerated amount of pressure from true pressure (e.g., less than 5 Pa), $T_{remote}$ is an estimate of temperature (e.g., in Kelvin) at the location of the reference pressure sensor or a different location of a remote temperature sensor, $h_{sensor}$ is an estimated altitude of the reference pressure sensor that is estimated to within a desired amount of altitude error (e.g., less than 1.0 meters), g corresponds to the acceleration due to gravity, R is a gas constant, and M is molar mass of air (e.g., dry air or other). The minus sign (−) may be substituted with a plus sign (+) in alternative embodiments of Equation 1, as would be understood by one of ordinary skill in the art. The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor. The reference-level pressure can be determined as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the reference pressure sensor, $P_{ref}$ is the reference-level pressure estimate, and $h_{ref}$ is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

The pressure sensor of the mobile device is typically inexpensive and susceptible to drift over time. Consequently, the pressure sensor must be frequently calibrated. A typical approach for calibrating a pressure sensor determines a calibration adjustment (C) that, when applied to a measurement of pressure by the pressure sensor ($P_{mobile}$), results in an estimated altitude ($h_{mobile}$) that is within a tolerated amount of distance from the true altitude.

Unfortunately, the pressure sensor of a mobile device cannot be calibrated at every location of the mobile device, especially when the mobile device is not known to be at a known altitude (e.g., of a waypoint). Local pressure variation effects at a location can produce a localized pressure that does not align with outdoor pressure in a vicinity of the location, which introduces unacceptable error into the calibration result. Such pressure variation effects are common in buildings with heating, ventilation, and air conditioning (HVAC) systems and in vehicles that generate localized variations in pressure while moving. Not knowing the true altitude of a location within a tolerated amount error makes calibration impractical at such a location. The temperature inside the mobile device can also adversely affect measurements of pressure. However, calibration still must occur on a regular basis despite the above issues.

Different systems and methods for determining when to calibrate a pressure sensor of a mobile device are described in the disclosure that follows.

DETAILED DESCRIPTION

Systems and methods for determining when to calibrate a pressure sensor of a mobile device are described below.

Figure 1:
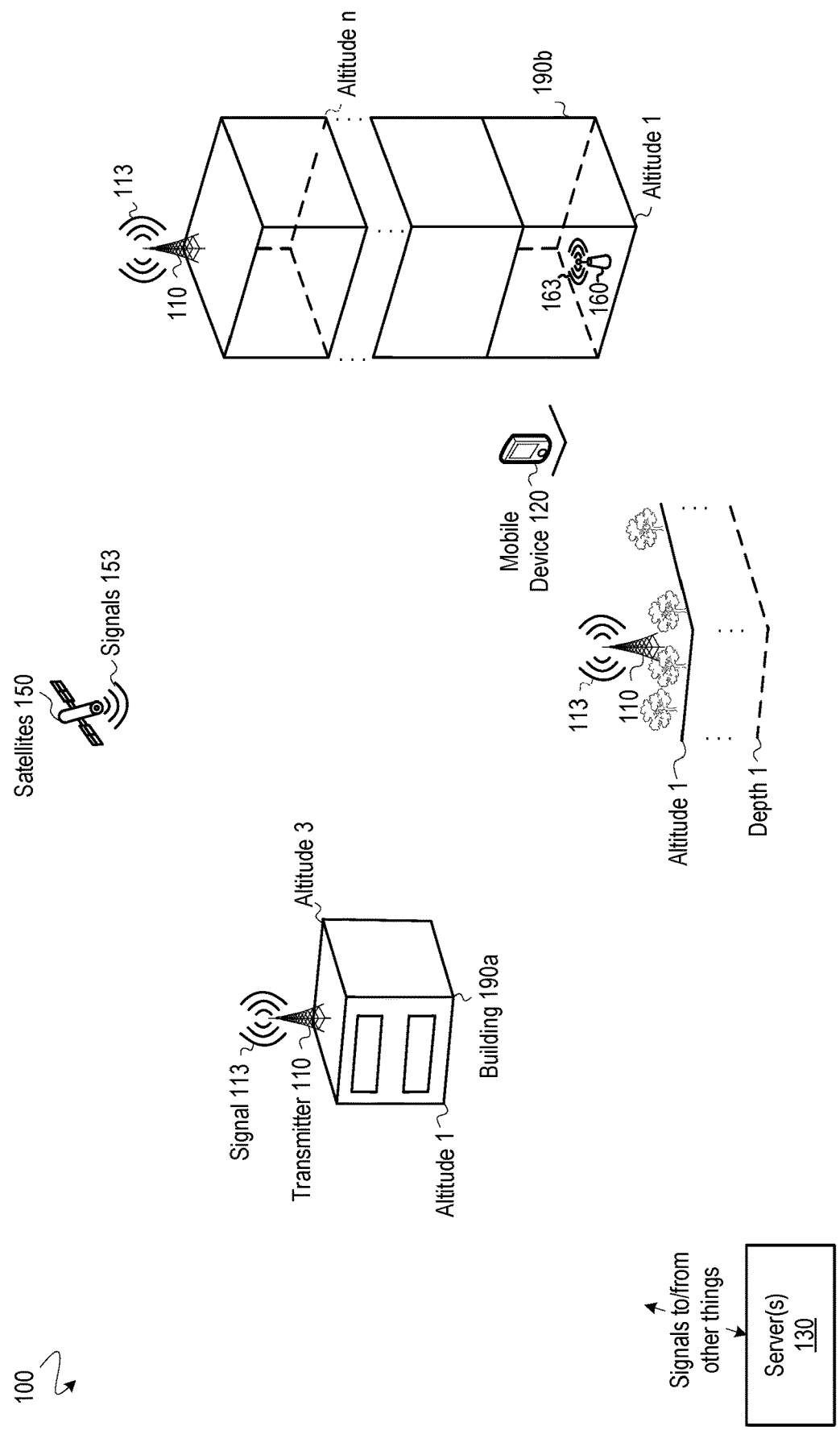
FIG. 1 shows an operational environment in which a pressure sensor of a mobile device may be calibrated.

Attention is initially drawn to an operational environment 100 illustrated in FIG. 1, which includes a network of terrestrial transmitters 110 and at least one mobile device 120. Each of the transmitters 110 and the mobile device 120 may be located at different altitudes or depths that are inside or outside various natural or manmade structures (e.g. buildings) 190. Positioning signals 113 and 153 are sent to the mobile device 120 from the transmitters 110 and satellites 150, respectively, using known wireless or wired transmission technologies. The transmitters 110 may transmit the signals 113 using one or more common multiplexing parameters—e.g. time slot, pseudorandom sequence, frequency offset, or other. The mobile device 120 may take different forms, including a mobile phone, a tablet, a laptop, a tracking tag, a receiver, or another suitable device that can receive the positioning signals 113 and/or 153, and that has a pressure sensor for determining a measurement of pressure at a location of the mobile device 120. The mobile device 120 usually includes a temperature sensor where a temperature of the pressure sensor or a battery is measured, which can roughly represent an internal temperature of the mobile device 120. Each of the transmitters 110 may also include a pressure sensor and a temperature sensor that respectively measure pressure and temperature at the location of that transmitter 110. Measurements of pressure and temperature can be used to compute an estimated altitude of the mobile device 120 using Equation 1, which is described in the Background section.

The pressure sensor of the mobile device 120 cannot be calibrated at every location of the mobile device in the operational environment 100. For example, if the mobile device 120 entered a building with an HVAC system that generates a localized pressure that does not align with outdoor pressure for the same altitude (e.g., the indoor pressure has been pushed or pulled by the HVAC system), future measurements of pressure by the pressure sensor while the mobile device 120 is inside the building may not be usable for calibration. If the exact position of the mobile device 120 is not known, and the possible positions of the mobile device 120 are distributed throughout an area that has significant altitude variation (e.g., greater than 2 meters), then calibration may not be possible where true altitude of the mobile device 120 is uncertain. If the temperature inside the mobile device 120 when at a particular location is high enough to distort pressure measurements from the pressure sensor, calibration may not be possible without introducing unacceptable error. Thus, solutions are needed for determining when a pressure sensor should or should not be calibrated. One approach for determining when to calibrate a pressure sensor of a mobile device is provided below with reference to FIG. 2.

Determining when to Calibrate a Pressure Sensor of a Mobile Device

Figure 2:
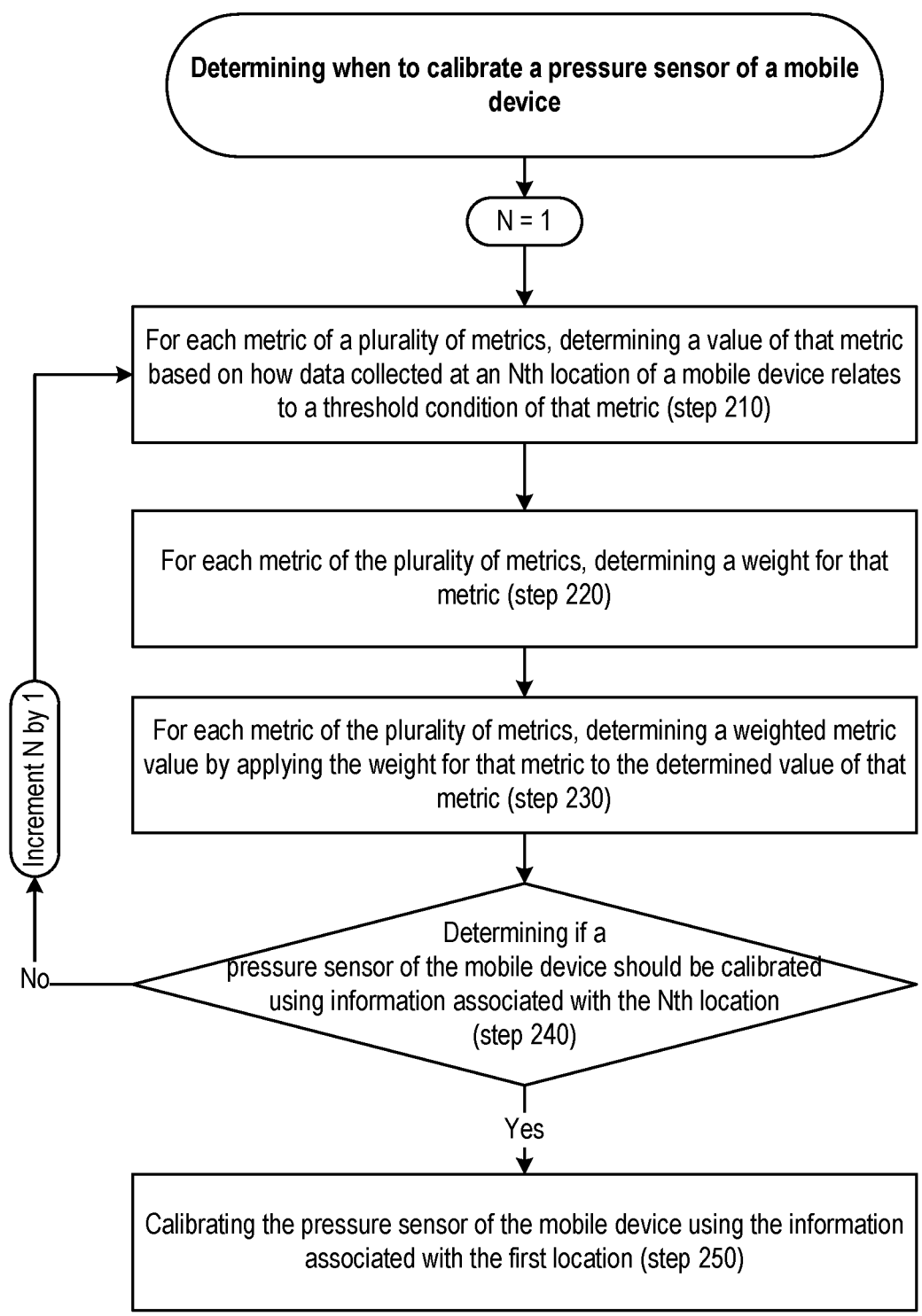
FIG. 2 depicts a process for determining when to calibrate a pressure sensor of a mobile device.

A process for determining when to calibrate a pressure sensor of a mobile device is shown in FIG. 2.

As shown, for each metric of a plurality of metrics, a value of that metric is determined based on how data collected at an Nth location of the mobile device relates to a threshold condition of that metric (step 210). By way of example, the Nth location may be a specific position at which the mobile device is located (e.g., a surveyed point), or an area in which the true position of the mobile device is located. Examples of metrics, values of metrics, collected data, and threshold conditions are described later under the 'Metrics' section.

For each metric of the plurality of metrics, a weight for that metric is determined (step 220). The weights may be the same for each metric, or may be different depending on desired implementation.

For each metric of the plurality of metrics, a weighted metric value is determined by applying the weight for that metric to the determined value of that metric (step 230). In one embodiment of step 230, the weighted metric is determined by multiplying the determined metric value and the weight.

Resultant weighted metric values are used to determine if a pressure sensor of the mobile device should be calibrated using information associated with the Nth location (step 240). Example methods for calibrating a pressure sensor of a mobile device are provided later in the 'Calibration' section. By way of example, the information associated with the Nth location may include: (i) a measurement of pressure at the Nth location that was measured by the pressure sensor; and (ii) an altitude value representing the true altitude of the Nth location. Examples of the altitude value representing the true altitude of a location include a known altitude of a specific position or a flat area, or a representative altitude of a non-flat area. Examples of a representative altitude value include: (i) a mean value of a plurality of altitude values in an area of possible positions of the mobile device (e.g., where an initial position estimate for the mobile device has error); (ii) a median value of the plurality of altitude values; (iii) the altitude value of a section at the center of the area in which the mobile device is known to reside; (iv) the most-common altitude value of the plurality of altitude values; (v) an interpolated altitude among centers of sections in the area; (vi) an interpolated altitude among centers of tiles neighboring an initial estimate of the mobile device's position; or (vii) any of the above examples, but with a smoothing filter applied. Each of these representative altitude values provide different advantages, as one of ordinary skill in the art would recognize. In nearly all cases, a mobile device is located at some height above terrain level during normal use—e.g., most of the time at the hip level of a user (e.g., in a pocket or bag), or on a table. An expected height of a mobile device above terrain can be accounted for during calibration (e.g., by adding the expected height above terrain to the values of (i) through (vii), where the expected height is typically around 0.75 to 1.0 meters.

If a determination is made that the pressure sensor of the mobile device should be calibrated using the information associated with the Nth location, the pressure sensor of the mobile device is calibrated using the information associated with the Nth location (step 250).

If a determination is made that the pressure sensor of the mobile device should not be calibrated using information associated with the Nth location, the information associated with the Nth location is not used to calibrate the pressure sensor. Instead, the mobile device eventually moves to a new location, and the process of FIG. 2 is repeated for the new location. Alternatively, conditions can change so that circumstances are now more advantageous for calibration. For example, if in a subsequent fix the location confidence reduces (e.g., from 100 m down to 10 m) owing to an improved position fix, which reduces the flatness metric and places the user outside, then the determination is made that the pressure sensor of the mobile device should be calibrated.

Figure 3:
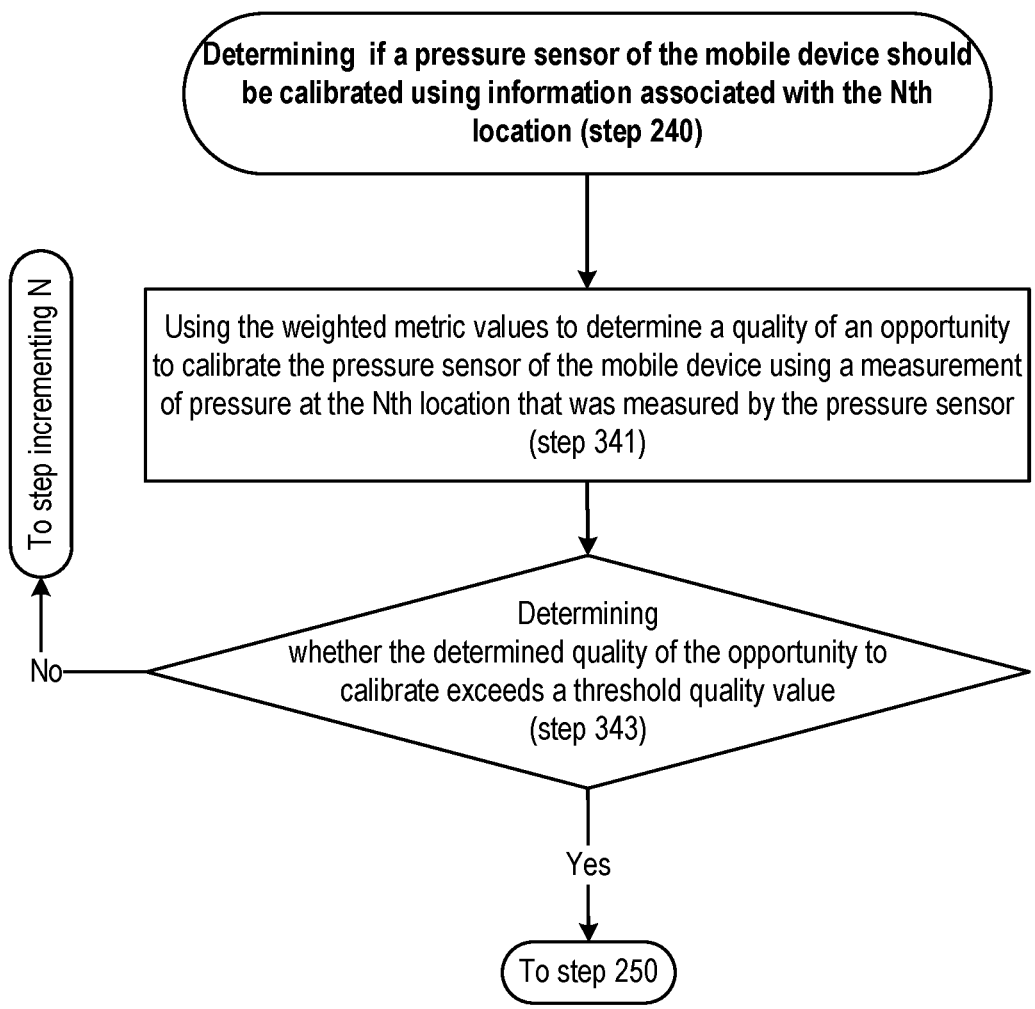
FIG. 3 depicts a process for using weighted metric values to determine if a pressure sensor of the mobile device should be calibrated using information associated with a location at which the mobile resided.

One embodiment of step 240 is depicted in FIG. 3. As shown, the weighted metric values are used to determine a quality of an opportunity to calibrate the pressure sensor using a measurement of pressure at the Nth location that was measured by the pressure sensor (step 341), and a determination is made as to whether the determined quality of the opportunity to calibrate exceeds a threshold quality value (step 343). The formula below illustrates one embodiment of step 341:

$$C = \frac{w_1 V_1 + \ldots + w_n V_n}{w_1 + \ldots + w_n}, \qquad \text{(Equation 3)}$$

where $V_1$ though $V_n$ are metric values, $w_1$ though $w_n$ are corresponding weights applied to the metric values, and C represents the quality of the opportunity to calibrate the pressure sensor using the information associated with the Nth location. In step 343, a threshold quality value $C_{threshold}$ is compared to C to determine if $C \geq C_{threshold}$. If $C \geq C_{threshold}$, then the pressure sensor of the mobile device is calibrated using the information associated with the Nth location (e.g., during step 250). If $C < C_{threshold}$, then the pressure sensor of the mobile device is not calibrated using the information associated with the Nth location.

Metrics

Different metrics, metric values, collected data, and threshold conditions are contemplated, as described below.

In different embodiments, any combination of different metrics listed below are used:

(i) Flatness metric (e.g., whether altitude(s) of the location meet a threshold altitude variation condition);

(ii) Pressure variation effect metric (e.g., whether the location is likely to be in a building or vehicle in which an HVAC effect or stack/chimney effect is present, or in a vehicle in which another pressure variation condition is present like a Venturi effect, where the pressure variation effect can impact the accuracy of a pressure measurement by the pressure sensor);

(iii) Building overlap metric (e.g., whether the location is likely to be outside at a known ground altitude or within a range of ground altitudes, and not inside a building at an unknown floor or affected by an indoor pressure variation effect that impacts accuracy of any pressure measurement, altitude measurement or calibration);

(iv) Indoor-outdoor signal strength detection metric (e.g., whether measured satellite signal strengths for signals from different satellites are above a threshold strength value that indicates the location is likely to be outside at a known ground altitude or within a range of ground altitudes, and not inside a building at an unknown floor or affected by an indoor pressure variation effect that impacts accuracy of any pressure measurement, altitude measurement or calibration);

(v) Indoor-outdoor altitude detection metric (e.g., whether an estimated altitude is above a threshold altitude that indicates the location is likely to be inside a building and not at a known ground altitude or within a range of ground altitudes; or e.g., whether an estimated altitude is below a threshold altitude that indicates the location is likely to be outside at a known ground altitude or within a range of altitudes, and not inside a building at an unknown floor or affected by an indoor pressure variation effect that impacts accuracy of any pressure measurement, altitude measurement or calibration);

(vi) Internal temperature metric (e.g., whether the internal temperature of the mobile device, such as a battery temperature retrieved from an API, is at a level of temperature that can impact the accuracy of a pressure measurement by the pressure sensor, which is sensitive to localized temperature that can produce up to 1 meter or more of altitude error);

(vii) Movement mode metric (e.g., whether a type of movement of the mobile device is conducive or not conducive for calibrating the pressure sensor, such as a driving mode that indicates a high likelihood a pressure variation effect exists that can impact the accuracy of a pressure measurement by the pressure sensor, which is different than a walking mode or a non-movement mode that reduce the likelihood that pressure variation effect exists; in some embodiments, subsequent types of movements can be correlated to look for transitions from one type to another, as certain transitions can more likely indicate better calibration opportunity, such as transitioning from being in a moving vehicle to being still, which likely indicates the vehicle has parked or is otherwise stopped at a location with a discernable altitude that offers a good opportunity to calibrate); and (viii) Time since last calibration metric (e.g., whether a threshold amount of time has passed since the pressure sensor was last calibrated according to calibration records stored on the mobile device or a location remote from the mobile device, where a time exceeding the threshold amount of time indicates a need for calibration).

For each of the above metrics, examples of how a value of the metric is determined (e.g., during step 210) based on collected data and threshold conditions are provided below:

(i) Flatness metric—One process for determining the value of a flatness metric comprises: determining if a predefined percentage of the altitudes in an area of possible positions of the mobile device are within a first predefined distance of each other or within a second predefined distance of a determined altitude value (e.g., a mean or median of the altitudes within the area or a specific latitude and longitude at the center of an area of possible positions of a mobile device), where the first and second predefined distances may be the same or different, and defining the metric value based on the result of the determination. By way of example, a first value of the metric when the predefined percentage of the altitudes in the area are within the first predefined distance from each other or within the second predefined distance from the determined altitude value within the area is higher than a second value of the metric when the opposite is true. The flatness metric represents how accurate a calibration result may be when the true altitude of the mobile device is unknown, since having less variation in possible altitudes of true position of the mobile device reduces error in a calibration result, a pressure measurement, or an altitude measurement. By way of example, altitudes in an area can be obtained from a data source (e.g., an accessible data source of ground-level altitudes or building floor altitudes that are inside the area), where the area may be identified in different ways (e.g., the area includes a ground level area and/or building floors that are within a predefined distance from an initial estimate of the mobile device's position, where the initial estimate of the position includes estimated latitude and longitude and the predefined distance is a possible amount of error in the estimated position or another predefined distance; e.g., the area includes a defined area that includes a beacon connected to the mobile device).

(ii) Pressure variation effect metric—One process for determining the value of a pressure variation effect metric comprises: determining if a predefined percentage of pressure measurements from the pressure sensor during a predefined time period are within a first predefined amount of pressure from each other or within a second predefined amount of pressure from a determined pressure value (e.g., a mean or median of the pressure measurements) where the first and second predefined amounts of pressure may be the same or different, and defining the metric value based on the result of the determination. By way of example, a first value of the metric when the predefined percentage of the pressure measurements are within the first predefined amount of pressure from each other or within the second predefined amount of pressure from the determined pressure value pressure measurements is higher than a second value of the metric when the opposite is true. In an alternative process, determining the value of a pressure variation effect metric comprises: determining if a standard deviation of the pressure measurements is within a threshold standard deviation value, and defining the metric value based on the result of the determination, where a first value of the metric when the standard deviation of the pressure measurements is within the threshold standard deviation value is higher than a second value of the metric when the opposite is true. In an alternative process, determining the value of a pressure variation effect metric comprises: determining if any change in pressure during the predefined period of time exceeds a predefined amount of pressure change (e.g., a maximum amount of possible, naturally-occurring pressure change for the predefined period of time), and defining the metric value based on the result of the determination, where a first value of the metric when any change in pressure during the predefined period of time exceeds the predefined amount of pressure change is lower than a second value of the metric when the opposite is true. The pressure variation effect metric represents how accurate a calibration result may be depending on the possible existence of pressure variations that are not aligned with natural pressure variation and that may be due to HVAC effect, Venturi effect, stack/chimney effect, or other localized pressure variation effects. If detected pressure variation exceeds the boundaries of expected natural pressure variation, then the value of this metric indicates calibration should not occur using the information associated with the Nth location.

(iii) Building overlap metric—One process for determining the value of a building overlap metric comprises: determining a percentage of the Nth location (e.g., when the Nth location is an area of possible positions of the mobile device) that overlaps with an area occupied by a building (e.g., a building's footprint or polygon determined from a map or other data source), and defining the metric value based on the percentage. By way of example, the value of the metric is inversely proportional to the percentage (i.e., the higher the overlap, the lower the metric value). Another process for determining the value of a building overlap metric comprises: determining distances between the Nth location and one or more nearby buildings, determining if the smallest distance exceeds a threshold amount of distance, and defining the metric value based on the result of the determination, where a first value of the metric when the smallest distance exceeds the threshold amount of distance is higher than a second value of the metric when the smallest distance does not exceed the threshold amount of distance. The building overlap metric is useful in determining if the Nth location is not likely to be inside a building. Knowing if the mobile device is not likely to be inside a building (e.g., is likely to be outside) permits use of known outdoor altitudes, which reduces possible calibration error. In some situations, knowing that the mobile device is inside a building but on the ground floor of that building offers opportunities for calibration. Also, knowing if the mobile device is not likely to be inside a building increases confidence that a measurement of pressure by the pressure sensor is not impacted by an unnatural pressure variation effect produced by a building.

(iv) Indoor-outdoor signal strength detection metric—One process for determining the value of an indoor-outdoor signal strength detection metric comprises: determining if a measured strength of a signal received by the mobile device from a satellite exceeds a threshold signal strength value, and defining the metric value based on the result of the determination. By way of example, a first value of the metric when the measured signal strength exceeds the threshold signal strength value is higher than a second value of the metric when the measured signal strength does not exceed the threshold signal strength value. Another process for determining the value of an indoor-outdoor signal strength detection metric comprises: determining if measured strengths of signals received by the mobile device from a minimum number satellites each exceed a threshold signal strength value, and defining the metric value based on the result of the determination, where a first value of the metric when measured strengths of signals received from the minimum number satellites each exceeds the threshold signal strength value is higher than a second value of the metric when all of the measured strengths of signals received from the minimum number satellites do not exceed the threshold signal strength value. Another process for determining the value of an indoor-outdoor signal strength detection metric comprises: determining if a measured strength of a signal received by the mobile device from a beacon located inside a building exceeds a threshold signal strength value, and defining the metric value based on the result of the determination, where a first value of the metric when the measured signal strength exceeds the threshold signal strength value (e.g., when the signal is assumed to have been received inside the building) is lower than a second value of the metric when the measured signal strength does not exceed the threshold signal strength value. The indoor-outdoor signal strength detection metric is useful in determining if the Nth location is not likely to be inside a building (e.g., when measured strengths of signals of satellites maintain a signal level that is common for outdoor reception of the signals) or when the Nth location is likely to be inside a building (e.g., when measured strengths of signals of indoor beacons maintain a signal level that is common for indoor reception of the signals). The same benefits of knowing if the mobile device is not likely to be inside a building described above for the building overlap metric apply to the indoor-outdoor signal strength detection metric.

(v) Indoor-outdoor altitude detection metric—One process for determining the value of an indoor-outdoor altitude detection metric comprises: determining if a difference between an estimated altitude of the Nth location and an outdoor altitude (e.g., retrieved from a data source of ground-level outdoor altitudes) exceeds a threshold amount of altitude, and defining the metric value based on the result of the determination. By way of example, a first value of the metric when the difference exceeds the threshold amount of altitude is lower than a second value of the metric when the difference does not exceed the threshold amount of altitude. The indoor-outdoor altitude detection metric is useful in determining if the Nth location is likely to be inside a building (e.g., when the difference between an estimated altitude and an outdoor altitude exceeds a possible altitude error value, such that the Nth location is likely to be inside a building). Knowing if the mobile device is likely to be inside a building (e.g., is not likely to be outside) makes use of known outdoor altitudes for calibration less reliable even when an indoor altitude is unknown, which increases possible calibration error from using the outdoor altitude. Also, knowing if the mobile device is likely to be inside a building recognizes the risk that a measurement of pressure by the pressure sensor could be impacted by an unnatural pressure variation effect often produced by buildings.

(vi) Internal temperature metric—One process for determining the value of an internal temperature metric comprises: determining if a battery temperature of the mobile device when at the Nth location exceeds a threshold temperature value, and defining the metric value based on the result of the determination. By way of example, a first value of the metric when the battery temperature exceeds the threshold temperature value is lower than a second value of the metric when the battery temperature does not exceed the threshold temperature value. Measurements of pressure that are measured by a pressure sensor of a mobile device can be affected by the internal temperature of the mobile device, and error in an altitude computation due to the internal temperature can exceed a tolerated amount of error (e.g., 1 meter or more). Thus, it is helpful to identify circumstances when the measurement of pressure at the Nth location that was measured by the pressure sensor of the mobile device may be affected by the internal temperature of the mobile device. By way of example, battery temperature may be measured using a temperature sensor of the mobile device.

(vii) Movement mode metric—One process for determining the value of a movement mode metric comprises: determining a mode (e.g., not moving, moving at a walking speed, moving with a vehicle, or unknown, as retrieved from an API), and defining the metric value based on the result of the determination. By way of example, a first value of the metric when the mode indicates the mobile device is not moving is higher than a second value of the metric when the mode indicates movement of the mobile device does not exceed a predefined walking speed, which is higher than a third value of the metric when the mode indicates movement of the mobile device is expected to be within a vehicle or when the mode is unknown. This metric represents a likelihood that the mobile device is not inside a moving vehicle. Since pressure variation inside moving vehicles can result in unreliable pressure measurements from the pressure sensor (e.g., due to the Venturi effect, HVAC, or a combination of the two), knowing if the mobile device is not likely to be in a moving vehicle increases confidence that calibration should occur using information associated with the Nth location. Determination of a movement mode can come from different sources, including inertial sensor measurements, a navigation application, or detecting a measured pressure profile that is due to vehicle movement. Also, in some embodiments, a determination is made that the mobile device has transitioned between different movement modes, which allows for correlating the movement as an indicator that the current mode provides for high confidence that the mobile device is in an optimal situation for sensor calibration—e.g., Driving/In Moving Vehicle mode followed by Still/Stationary mode likely indicates that a user parked his/her car and is likely to be at ground level and not likely to be in an upper floor of a building.

(viii) Time since last calibration metric—One process for determining the value of a time since last calibration metric comprises: determining a time since a last calibration of the pressure sensor (e.g., determined from a stored calibration history, which may include a time stamp of the last calibration, which can be compared to a current time of a clock), and defining the metric value based on the result of the determination. By way of example, a first value of the metric when the time exceeds a threshold amount of time is higher than a second value of the metric when the time does not exceed the threshold amount. This metric represents how likely drift has exceeded a tolerated amount of drift, since more drift typically occurs as more time passes since the previous calibration.

Different types of metric values are contemplated, including: a binary value (e.g., threshold is met=1, threshold is not met=0), a linear value (e.g., highest threshold is met=1, highest threshold is not met, but lowest threshold is met=0.5, lowest threshold is not met=0), or some other pre-defined set of values. Examples of possible values for different metrics are provided below:

(i) Flatness metric example values:
  a. when at least P % of altitudes are within m meters from each other or a mean of the altitudes (e.g., value=1; otherwise value=0), where P and m may be predefined numbers (e.g., 80% and 1 meter, respectively);
  b. when at least $P_1$% of altitudes are within m meters from each other or a mean of the altitudes (e.g., value=1.0), when less than $P_1$% but at least $P_2$% of altitudes are within m meters from each other or a mean of the altitudes (e.g., value=0.5), when less than $P_2$% of altitudes are within m meters from each other or a mean of the altitudes (e.g., value=0.0), where $P_1$, $P_2$ and m may be predefined numbers (e.g., 80%, 60% and 1 meter, respectively); or
  c. when at least P % of altitudes are within $m_1$ meters from each other or a mean of the altitudes (e.g., value=1.0), when at least P % of altitudes are not within $m_1$ meters, but are within $m_2$ meters from each other or a mean of the altitudes (e.g., value=0.5), when at least P % of altitudes are not within $m_2$ meters from each other or a mean of the altitudes (e.g., value=0.0), where P, $m_1$, and $m_2$ may be predefined numbers (e.g., 80%, 1 meter and 2 meters, respectively).
    d. Note: a mean was used in the examples above; however, in other embodiments, a median or other value-of-interest can be used instead of a mean.
(ii) Pressure variation effect metric example values:
    a. over a time period T, when at least P % pressure measurements are within p Pa of each other or a mean of the pressure measurements (e.g., value=1; otherwise value=0), where T, P and p may be predefined numbers (e.g., 1 minute, 80% and 10 Pa, respectively);
    b. over a time period T, when at least $P_1$% of pressure measurements are within p Pa of each other or a mean of the pressure measurements (e.g., value=1.0), when less than $P_1$% but at least $P_2$% of pressure measurements are within p Pa of each other or a mean of the pressure measurements (e.g., value=0.5), when less than $P_2$% of pressure measurements are within p Pa of each other or a mean of the pressure measurements (e.g., value=0.0), where T, $P_1$, $P_2$ and p may be predefined numbers (e.g., 1 minute, 90%, 75%, and 10 Pa, respectively); or
    c. over a time period T, when at least P % of pressure measurements are within $p_1$ Pa of each other or a mean of the pressure measurements (e.g., value=1.0), when P % of pressure measurements are not within $p_1$ Pa of each other or a mean of the pressure measurements, but are within $p_2$ Pa of each other or a mean of the pressure measurements (e.g., value=0.5), when P % of pressure measurements are not within $p_2$ Pa of each other or a mean of the pressure measurements (e.g., value=0.0), where T, $p_1$, $p_2$ and P may be predefined numbers (e.g., 1 minute, 10 Pa, 20 Pa, and 90%, respectively).
    d. Note: a mean was used in the examples above; however, in other embodiments, a median or other value-of-interest can be used instead of a mean.
(iii) Building overlap metric example values:
    a. when P % of an area of possible positions of the mobile device overlaps with a building (e.g., value= [100−P]/100);
    b. when at least P % of an area of possible positions of the mobile device does not overlap with a building (e.g., value=1; otherwise value=0), where P may be a predefined number (e.g., 50%); or
    c. when at least $P_1$% of an area of possible positions of the mobile device does not overlap with a building (e.g., value=1.0), when less than $P_1$% but at least $P_2$% of an area of possible positions of the mobile device does not overlap with a building (e.g., value=0.5), when less than $P_2$% of an area of possible positions of the mobile device does not overlap with a building (e.g., value=0.0), where $P_1$ and $P_2$ may be a predefined number (e.g., 80% and 50%, respectively).
(iv) Indoor-outdoor signal strength detection metric example values:
    a. when signals from at least n satellites each have a signal strength of at least S dB (e.g., value=1; otherwise value=0), where n and S may be predefined numbers (e.g., 4 satellites and 30 dB, respectively);
    b. when all signals from at least $n_1$ satellites each have a signal strength of at least S dB (e.g., value=1.0), when all signals from at least $n_1$ satellites do not have a signal strength of at least S dB, but all signals from $n_2$ (for $n_2$ less than $n_1$) satellites each have a signal strength of at least S dB (e.g., value=0.5), when all signals from $n_2$ satellites do not have a signal strength of at least S dB (e.g., value=0.0), where $n_1$, $n_2$ and S may be predefined numbers (e.g., 4 satellites, 3 satellites, and 30 dB, respectively); or
    c. when all signals from at least n satellites each have a signal strength of at least $S_1$ dB (e.g., value=1.0), when all signals from at least n satellites do not have a signal strength of at least $S_1$ dB, but all signals from at least n satellites each have a signal strength of at least $S_2$ (for $S_2$ less than $S_1$) dB (e.g., value=0.5), when all signals from n satellites do not have a signal strength of at least $S_2$ dB (e.g., value=0.0), where n, $S_1$ and $S_2$ may be predefined numbers (e.g., 4 satellites, 30 dB, and 20 dB, respectively).
(v) Indoor-outdoor altitude detection metric example values: when an estimated altitude of the mobile device while at the Nth location is greater than a predefined amount of altitude A from an altitude (e.g., ground-level) of an outdoor position that is within a threshold distance from an initial estimate of the mobile device's position (e.g., value=0; otherwise value=1), where A may be predefined (e.g., 5 meters); or when an estimated altitude of the mobile device while at the Nth location is greater than or equal to a first predefined amount of altitude $A_1$ from an altitude of an outdoor position that is within a threshold distance from an initial estimate of the mobile device's position (e.g., value=0), when the estimated altitude of the mobile device while at the Nth location is less than the first predefined amount of altitude $A_1$, but greater than or equal to a second predefined amount of altitude $A_2$ from the altitude of the outdoor position (e.g., value=0.5), and when the estimated altitude of the mobile device while at the Nth location is less than the second predefined amount of altitude $A_2$ from the altitude of the outdoor position (e.g., value=1), where $A_1$=5 meters, and $A_2$=3 meters.
(vi) Internal temperature metric example values: when an internal temperature (e.g., a measured battery temperature or a measured temperature of the pressure sensor of the mobile device) is less than a predefined amount of temperature T (e.g., value=1; otherwise value=0), where T may be predefined (e.g., 35 degrees Celsius); or when the internal temperature is less than a first predefined amount of temperature $T_1$ (e.g., value=1), when the internal temperature is greater than or equal to the first predefined amount of temperature $T_1$ and less than a second predefined amount of temperature $T_2$ (e.g., value=0.5), and when the internal temperature is greater than or equal to the second predefined amount of temperature $T_2$ (e.g., value=0.0), where $T_1$ and $T_2$ may be predefined (e.g., 30 and 35 degrees Celsius, respectively).
(vii) Movement mode metric example values: when no movement is detected (e.g., value=1), when walking movement is detected (e.g., value=1 or lower value greater than 0), when driving movement is detected (e.g., value=0), when status of movement unknown (e.g., value=0 or higher value less than 1).
(viii) Movement mode transition metric example values: if a user transitions from Driving to Still (e.g., value=1). If a user transitions from Still to Walking (e.g. value=0.5). If a user transitions from Still to Driving (e.g. value=0.0).

(ix) Time since last calibration metric example values: when a time since last calibration is greater than a predefined amount of time T (e.g., value=1; otherwise value=0), where T may be predefined depending on the expected drift of the pressure sensor (e.g., 48 hours).

Different ways of using metric values are contemplated. For example, higher metric values can be used for circumstances that indicate the pressure sensor of the mobile device should be calibrated using information associated with the Nth location, and lower metric values can be used for circumstances that indicate the pressure sensor of the mobile device should not be calibrated using information associated with the Nth location. Alternatively, lower metric values can be used for circumstances that indicate the pressure sensor of the mobile device should be calibrated using information associated with the Nth location, and higher metric values can be used for circumstances that indicate the pressure sensor of the mobile device should not be calibrated using information associated with the Nth location.

The weights used to produce weighted values may be the same for each metric, or different depending on the metric. Some weights might be greater than others (e.g., the weight for the time since last calibration metric may be greater than weights for other metrics where the amount of drift is believed to exceed any amount of error introduced by other issues).

Weighted values can be combined in different ways to produce a value that represents how good of an opportunity an Nth location provides for calibrating a pressure sensor of a mobile device. Example combinations include a weighted mean or other combinations. The produced value (e.g., a number between 0 and 1) may then be compared (e.g., as being greater than or less than) to a threshold value (e.g., a number between 0 and 1, such as 0.5) to determine if calibration should occur.

Calibration

One approach for calibrating a pressure sensor of a mobile device is described below. Initially, an estimated altitude $h_{mobile}$ is computed as:

$$h_{mobile} = h_{ref} \mp \frac{RT_{remote}}{gM} \ln\left(\frac{P_{ref}}{P_{mobile}}\right),$$ (Equation 4)

where $P_{mobile}$ is the estimate of pressure at the location of the mobile device, $P_{ref}$ is an estimate of pressure at a reference location, $T_{remote}$ is an estimate of ambient temperature (e.g., in Kelvin), $h_{ref}$ is the known altitude of the reference location, g corresponds to acceleration due to gravity, R is a gas constant, and M is molar mass of air (e.g., dry air or other). To calibrate the pressure sensor of the mobile device, the aim is to determine an adjustment to the value of $P_{mobile}$ such that $h_{mobile}$ is within a tolerated amount of distance from the true altitude of the mobile device, $h_{truth}$.

During calibration, a representative altitude value of the area in which the mobile device is expected to reside can be assigned as the true altitude of the mobile device, $h_{truth}$. Alternatively, the representative altitude value adjusted by a typical height at which the mobile device is likely to be held above the ground can be assigned as the true altitude of the mobile device, $h_{truth}$. Examples of representative altitude values are described earlier with respect to step 240 of FIG. 2.

Once the true altitude of the mobile device, $h_{truth}$, is determined, a calibration value C needed to adjust the estimate of pressure at the location of the mobile device, $P_{mobile}$, is determined using the formula below:

$$h_{truth} = h_{ref} \mp \frac{RT}{gM} \ln\left(\frac{P_{reference}}{P_{mobile} + C}\right).$$ (Equation 5)

Alternatively, differentiating pressure with respect to height can be used to help determine the calibration value C. The following relationship:

$$P_{at\,h_1} = P_{at\,h_2} \exp\left(\frac{gM(h_2 - h_1)}{RT}\right),$$ (Equation 6)

can be used to derive the following formula:

$$\frac{dP}{dh} = \frac{gMP}{RT} \approx 0.034\frac{P}{T}.$$ (Equation 7)

If a pressure measurement of by the mobile device is P=101000 Pa and ambient temperature is T=300 K, the formula of Equation 7 results in dP/dh≈11.5 Pa/m. The values of P and T are reasonable assumptions for nominal weather, and the scale factor of 11.5 Pa/m can range between ~9-12 Pa/m if the weather gets cooler or hotter. This means for every meter adjustment to be made to get $h_{truth}$ to align with $h_{mobile}$ the calibration value C can be adjusted by 11.5 Pa. In this example, if $h_{mobile}$=12.0 m and $h_{truth}$=8 m, the difference in altitude can be scaled by 11.5 Pa/m to get the difference in pressure, or C=46 Pa as shown below:

$$C = (h_{truth} - h_{phone}) \times \frac{dP}{dh} = (12 - 8) \times 11.5 = 46.$$ (Equation 8)

Technical Benefits

Processes described herein improve the fields of sensor calibration and location determination by determining when circumstances permit effective calibration of a sensor that is necessary for accurate altitude determination. Prior approaches that do not detect undesirable circumstances for calibration are more likely to calibrate sensors or estimate positions with less or even unacceptable accuracy. By improving calibration of a pressure sensor of a mobile device, processes described herein provide for increased accuracy and reliability of estimated positions based on that improved calibration, which enables quicker emergency response times or otherwise improves the usefulness of estimated positions. Battery life of a mobile device is improved by selectively not performing calibration at a mobile device (and therefore not consuming battery life needed for calibration) during certain circumstances when other approaches would consume battery capacity by non-selectively calibrating the pressure sensor. Equipment that is susceptible to producing previously unusable data (e.g., a pressure sensor that produces pressure data with lower-than-desirable accuracy due to drift or inherent resolution of the equipment) is improved by providing for improved calibration of that previously unusable equipment and its data. The processes create new and useful data, such as data representing a quality of an opportunity to calibrate, which is indicative of when calibration of a pressure sensor should or should not occur. Prior approaches that do not produce this data prior to calibration or position determination are more likely to calibrate or estimate positions with less accuracy.

Other Aspects

By way of example, the processes disclosed above may be performed by one or more machines that include: processor(s) or other computing device(s) (e.g., at a mobile device and/or a server) for performing (e.g., that perform, or are configured, adapted or operable to perform) each step; data source(s) at which any data identified in the processes is stored for later access during the processes; and particular machines for obtaining data used to determine metrics (e.g., signal processing components to determine signal strengths, a temperature sensor to measure temperatures, a pressure sensor to measure pressures, a clock to measure time, inertial sensors to measure movement, or other machines).

Any method (also referred to as a "process" or an "approach") described or otherwise enabled by disclosure herein may be implemented by hardware components (e.g., machines), software modules (e.g., stored in machine-readable media), or a combination thereof. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media (e.g. one or more non-volatile or volatile storage media, removable or non-removable media, integrated circuit media, magnetic storage media, optical storage media, or any other storage media, including RAM, ROM, and EEPROM) that may be patented under the laws of the jurisdiction in which this application is filed, but does not include machine-readable media that cannot be patented under the laws of the jurisdiction in which this application is filed. Systems that include one or more machines and one or more non-transitory machine-readable media are also contemplated herein. One or more machines that perform or implement, or are configured, operable or adapted to perform or implement operations comprising the steps of any methods described herein are also contemplated herein. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

Figure 4:
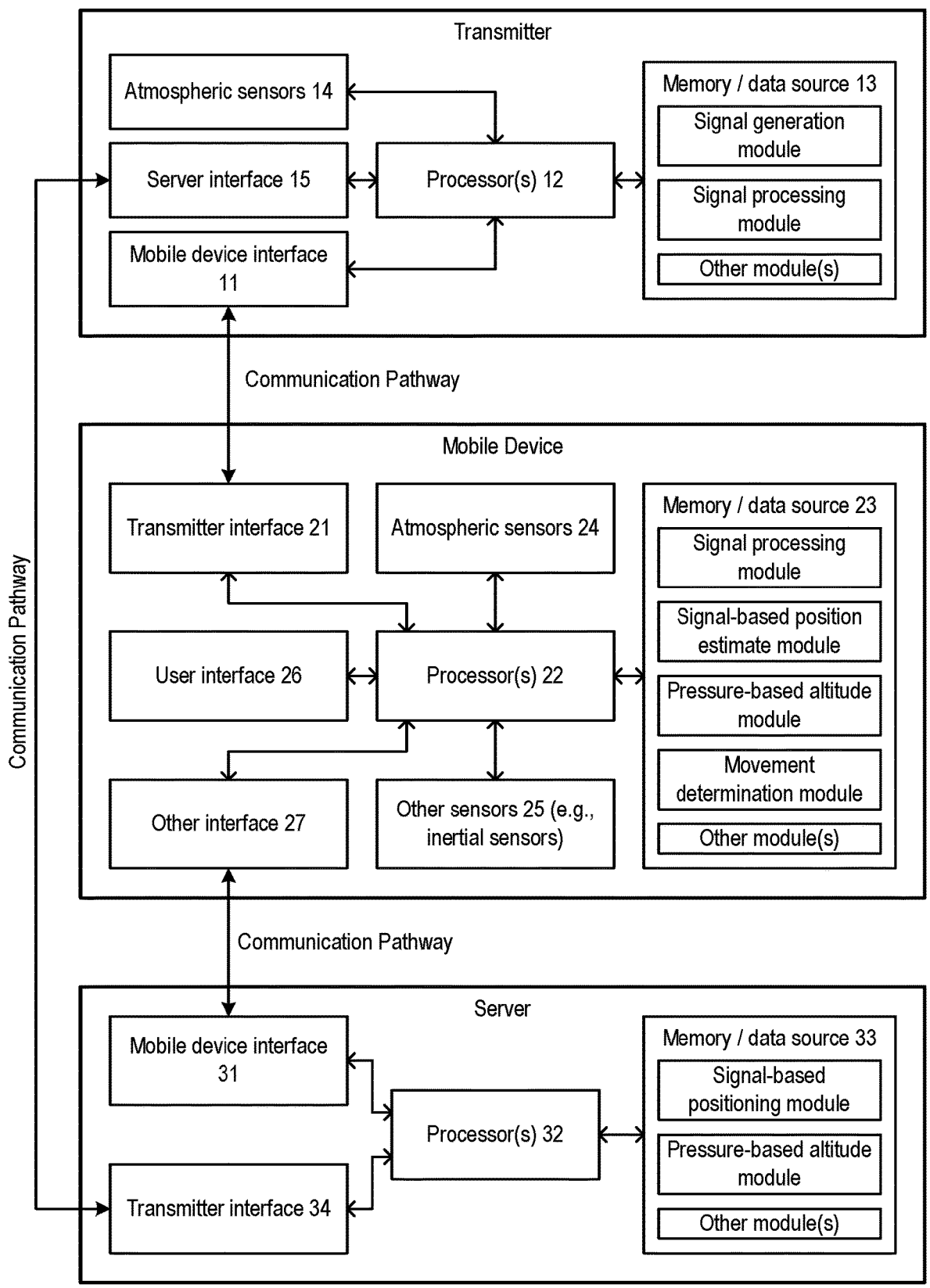
FIG. 4 illustrates components of a transmitter, a mobile device, and a server.

FIG. 4 illustrates components of a transmitter, a mobile device, and a server. Examples of communication pathways are shown by arrows between components.

By way of example in FIG. 4, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example FIG. 4, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 4, the server may include: a mobile device interface 21 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. Pub. No. 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

The invention claimed is:

1. A method, comprising:
   for each metric of a plurality of metrics, determining a weighted metric value by applying a weight for that metric to a determined value of that metric;
   using the weighted metric values to determine if a pressure sensor of a mobile device should be calibrated using information associated with a first location; and
   if the pressure sensor of the mobile device should be calibrated using the information associated with the first location, using the information associated with the first location to calibrate the pressure sensor of the mobile device.

2. The method of claim 1, wherein using the weighted metric values to determine if a pressure sensor of a mobile device should be calibrated using information associated with a first location comprises:
   using the weighted metric values to determine a quality of an opportunity to calibrate the pressure sensor of the mobile device using a measurement of pressure of the first location that was measured by the pressure sensor; and
   determining if the determined quality of the opportunity to calibrate exceeds a threshold quality value,
   wherein the information includes the measurement of pressure and the pressure sensor of the mobile device is calibrated using the measurement of pressure if the determined quality of the opportunity to calibrate exceeds the threshold quality value.

3. The method of claim 1, wherein if the pressure sensor of the mobile device should not be calibrated using the information associated with the first location, the method further comprises:
   for each metric of the plurality of metrics, determining a new value of that metric based on how data collected at a second location of the mobile device relates to a threshold condition of that metric;
   for each metric of the plurality of metrics, determining a new weighted metric value by applying the weight for that metric, or a new weight for that metric, to the determined new value of that metric;

using the new weighted metric values to determine if the pressure sensor of the mobile device should be calibrated using information associated with the second location; and if the pressure sensor of the mobile device should be calibrated using the information associated with the second location, using the information associated with the second location to calibrate the pressure sensor of the mobile device.

4. The method of claim 1, wherein determining a weighted metric value by applying the weight for that metric to the metric comprises:

determining the weighted metric value by multiplying the value of that metric and the weight.

5. The method of claim 1, wherein the information associated with the first location includes a measurement of pressure at the first location that was measured by the pressure sensor, and an altitude value associated with the first location.

6. The method of claim 5, the altitude value associated with the first location includes a known altitude of a specific position or flat area.

7. The method of claim 5, the altitude value associated with the first location includes a representative altitude of a non-flat area.

8. The method of claim 1, wherein one of the metrics represents whether altitudes of the first location meet a threshold altitude variation condition.

9. The method of claim 1, wherein one of the metrics represents whether the first location is likely to be in a building or vehicle in which an HVAC effect or stack/chimney effect is present, or in a vehicle in which another pressure variation condition is present.

10. The method of claim 1, wherein one of the metrics represents whether the first location is likely to be at a ground floor of a building, outside at a known ground altitude, or within a range of altitudes.

11. The method of claim 1, wherein one of the metrics represents whether measured satellite signal strengths for signals from different satellites are above a threshold strength value that indicates the first location is likely to be outside at a known ground altitude or within a range of altitudes.

12. The method of claim 1, wherein one of the metrics represents whether an estimated altitude is above a threshold altitude that indicates the first location is likely to be inside a building and not at a known ground altitude or within a range of altitudes.

13. The method of claim 1, wherein one of the metrics represents whether an internal temperature of the mobile device is at a level of temperature that can impact an accuracy of a pressure measurement by the pressure sensor.

14. The method of claim 1, wherein one of the metrics represents whether a type of movement of the mobile device is conducive or not conducive for calibrating the pressure sensor.

15. The method of claim 1, wherein one of the metrics represents whether a threshold amount of time has passed since the pressure sensor was last calibrated according to calibration records stored on the mobile device or a location remote from the mobile device.

16. The method of claim 15, wherein the weight for the metric representing whether a threshold amount of time has passed since the pressure sensor was last calibrated is greater than weights for other metrics of the plurality of metrics.

17. The method of claim 1, wherein a first weight for a first metric of the plurality of metrics is greater than a second weight of a second metric of the plurality of metrics, wherein the first metric represents whether a threshold amount of time has passed since the pressure sensor was last calibrated.

18. The method of claim 1, wherein the plurality of metrics include two or more metrics from the following: a metric representing whether altitudes of the first location meet a threshold altitude variation condition; a metric representing whether the first location is likely to be in a building or vehicle in which an HVAC effect or stack/chimney effect is present, or in a vehicle in which another pressure variation condition is present; a metric representing whether the first location is likely to be outside at a known ground altitude or within a range of altitudes; a metric representing whether measured satellite signal strengths for signals from different satellites are above a threshold strength value that indicates the first location is likely to be outside at a known ground altitude or within a range of altitudes; a metric representing whether an estimated altitude is above a threshold altitude that indicates the first location is likely to be inside a building and not at a known ground altitude or within a range of altitudes; a metric representing whether an internal temperature of the mobile device is at a level of temperature that can impact an accuracy of a pressure measurement by the pressure sensor; a metric representing whether a type of movement of the mobile device is conducive or not conducive for calibrating the pressure sensor; and a metric representing whether a threshold amount of time has passed since the pressure sensor was last calibrated according to calibration records stored on the mobile device or a location remote from the mobile device.

19. One or more non-transitory machine-readable media embodying program instructions that, when executed by one or more machines, cause the one or more machines to implement the method of claim 1.

20. A system for determining when to calibrate a pressure sensor of a mobile device, the system comprising one or more machines configured to perform the method of claim 1.

* * * * *